United States Patent
Kobayashi (10) Patent No.: US 7,808,869 B2
(45) Date of Patent: Oct. 5, 2010

(54) INFORMATION RECORDING APPARATUS, INFORMATION RECORDING METHOD, INFORMATION PLAYBACK APPARATUS, AND INFORMATION PLAYBACK METHOD

(75) Inventor: Tadashi Kobayashi, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 378 days.

(21) Appl. No.: 12/048,142

(22) Filed: Mar. 13, 2008

(65) Prior Publication Data

US 2008/0267028 A1 Oct. 30, 2008

(30) Foreign Application Priority Data

Apr. 27, 2007 (JP) ............................. 2007-120107

(51) Int. Cl.
*G11B 7/00* (2006.01)
(52) U.S. Cl. ................... 369/53.22; 369/84; 369/47.27
(58) Field of Classification Search ................... 369/84, 369/83, 85, 47.27, 53.22, 53.27, 53.1, 47.46, 369/47.29, 47.21
See application file for complete search history.

(56) References Cited

U.S. PATENT DOCUMENTS 7,554,889 B2 * 6/2009 Navon et al. ............. 369/47.28

FOREIGN PATENT DOCUMENTS

| JP | 11-150706 | 6/1999 |
|---|---|---|
| JP | 2000-115701 | 4/2000 |
| JP | 2000-115705 | 4/2000 |
| JP | 2003-111023 | 4/2003 |
| JP | 2005-71510 | 3/2005 |
| JP | 2006-50179 | 2/2006 |
| JP | 2006-260611 | 7/2006 |

* cited by examiner

*Primary Examiner*—Nabil Z Hindi
(74) *Attorney, Agent, or Firm*—Knobbe, Martens, Olson & Bear LLP (57) ABSTRACT

According to one embodiment, an information recording apparatus which records content compliant with a second DVD standard on an information storage medium, the second DVD standard being a DVD standard later than a first DVD standard defined for a first image quality and being defined for a second image quality higher than the first image quality, includes a determination unit configured to determine whether narrow burst cutting area (NBCA) of the information storage medium is valid or not, and whether supported maximum recording speed of the information storage medium is triple speed or more of a predetermined recording speed, and a recording unit configured to perform real-time recording of the content compliant with the second standard on the information storage medium on the basis of the determination.

8 Claims, 6 Drawing Sheets

| Item | Specifications |
|---|---|
| • Nominal linear velocity of triple-speed playback | 10.47 m/s (single-layer disc)<br>11.52 m/s (double-layer disc) |
| • Channel bit transfer rate of triple-speed playback | 78.47 Mbps |
| • User bit transfer rate of triple-speed playback | 33.24 Mbps |

INFORMATION RECORDING APPARATUS, INFORMATION RECORDING METHOD, INFORMATION PLAYBACK APPARATUS, AND INFORMATION PLAYBACK METHOD

CROSS-REFERENCE TO RELATED APPLICATIONS

This application is based upon and claims the benefit of priority from Japanese Patent Application No. 2007-120107, filed Apr. 27, 2007, the entire contents of which are incorporated herein by reference.

BACKGROUND

1. Field

One embodiment of the invention relates to an information recording apparatus and an information recording method which record content compliant with a second DVD standard, which is a DVD standard later than a first DVD standard defined for a first image quality and is defined for a second image quality higher than the first image quality, on image storage media such as DVD-R/RWs.

Further, one embodiment of the invention relates to an information playback apparatus and an information playback method which play back HD DVD content compliant with the second DVD standard from information storage media such as DVD-R/RW.

2. Description of the Related Art

Various products compliant with the normal DVD standard (the first-generation DVD standard) defined for the standard image quality have already been widely spread. With increase in image compression technique in these several years, there are users' and content providers' demands for further improvement of image quality. Further, in addition to demands for accomplishment of higher image quality, content providers demand environment for providing more attractive content to users by expansion of the content, such as a more colorful menu and improved interactivity in content such as menu screens and extra images, including main titles. To deal with such demands, Jpn. Pat. Appln. KOKAI Pub. No. 2006-260611 discloses a technique concerning an DH DVD standard (second-generation DVD standard) to achieve provision of more attractive content.

While the environment for providing HD DVD content compliant with the HD DVD standard is ripe as described above, the convenience of media (DVD-R/RW) compliant with the normal DVD standard is still high. Therefore, there is a demand for a technique of appropriately recording HD DVD content on DVD-R/RWs and the like, and appropriately playing back HD DVD content recorded on DVD-R/RW.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information recording apparatus which records content compliant with a DVD standard for high image quality on an information storage medium comprises: a reading unit configured to read information recorded on an information storage medium; a determination unit configured to determine whether the NBCA of the information storage medium is valid or not, and whether supported maximum recording speed of the information storage medium is triple speed, i.e. three times faster of a normal recording speed, or more, based on the information read by the reading unit; and a recording unit configured to perform real-time recording of the content compliant with the DVD standard for high image quality on the information storage medium which satisfies a condition that the NBCA of the information storage medium is valid and the supported maximum recording speed of the information storage medium is triple speed or more.

An embodiment of the invention is described below with reference to drawings.

Figure 10:
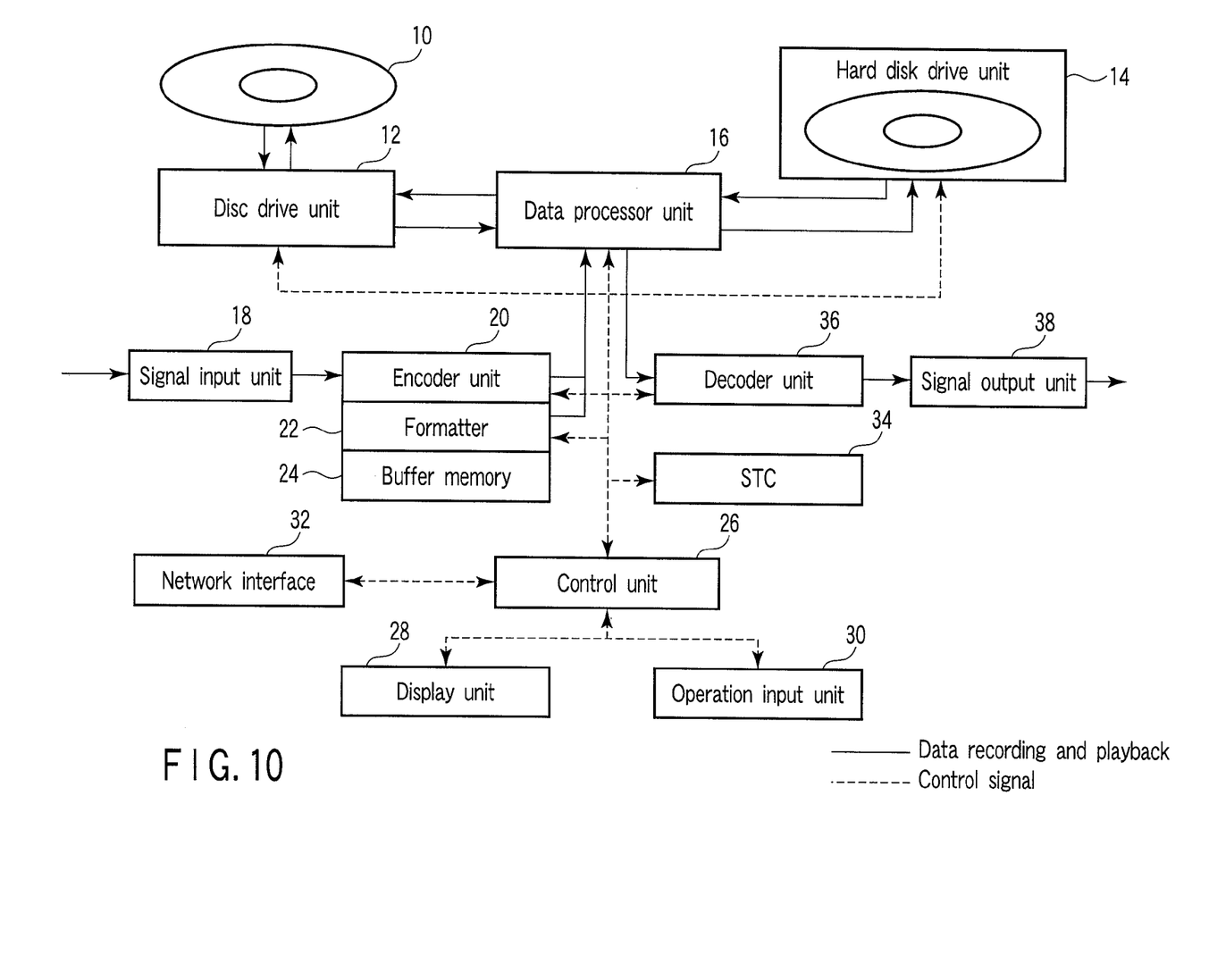
FIG. 10 is a block diagram illustrating a schematic structure of the information recording and playback apparatus according to the embodiment.

FIG. 10 is a block diagram illustrating a schematic structure of an information recording and playback apparatus according to the embodiment.

The information recording and playback apparatus can selectively record information on an optical disc 10 such as a DVD-R/RW, and a hard disk drive (HDD) unit 14. Further, the information recording and playback apparatus can temporarily record external information on the hard disk drive unit 14, and then move (record) the information recorded on the hard disk drive unit 14 to the optical disc 10. The hard disk drive unit 14 (external storage device) is not an indispensable constituent element of the information recording and playback apparatus, but an optional constituent element. Further, the information recording and playback apparatus may have, for example, a semiconductor memory as an option, as an information recording device. A semiconductor memory can be used as a temporary information recording memory, instead of the hard disk drive unit 14.

As illustrated in FIG. 10, the information recording and playback apparatus has two drive units, that is, a disc drive unit 12, and the hard disk drive unit 14. The disc drive unit 12 rotates and drives the optical disc 10, and performs information reading and writing. The disc drive unit 12 has a rotation control system, a laser drive system, and an optical system for the optical disc 10. Further, the hard disk drive unit 14 drives a hard disk, and performs information reading and writing.

Further, the information recording and playback apparatus has a data processor unit 16. The data processor unit 16 supplies recording data to the disc drive unit 12 and the hard disk drive unit 14, and receives read data read by the disc drive unit 12 and the hard disk drive unit 14. The data processor unit 16 processes recording data or playback data of predetermined unit, and has a buffer circuit, a modulation/demodulation circuit, and an error correction circuit, etc.

The information recording and playback apparatus also has an encoder unit 20, a formatter 22, a decoder unit 36, and a control unit 26. The encoder unit 20 encodes signals from a signal input unit 18. An encoded output signal from the encoder unit 20 is converted into a predetermined format by the formatter 22, and supplied to the data processor unit 16. The formatter 22 is connected with a buffer memory 24, in which the encoded output signal is stored. There are cases where the encoded output signal from the encoder unit 20 is directly recorded on the hard disk of the hard disk drive unit 14. When an encoded digital video signal and an encoded digital audio signal are directly input, the encoder unit 20 directly supplies the encoded digital video signal and the encoded digital audio signal to the formatter 22.

The format data from the formatter 22 is supplies to the hard disk drive unit 14 or the data disc drive unit 12 through the data processor unit 16, and recorded on the hard disk or the optical disc 10. Further, the format data recorded on the hard disk or the optical disc 10 can be recorded on the optical disc 10 or the hard disk through the data processor unit 16 and the disc drive unit 12 (hard disk optical disc/optical disc hard disk). Further, the data processor unit 16 can perform editing to delete part of data recorded on the hard disk or the optical disc 10, and connect parts of data.

The control unit 26 has an MPU (micro processing unit) or CPU (central processing unit), a ROM in which control program is written, and a RAM to provide a work area necessary for executing programs. Among execution results of the MPU, the content to be notified to the user is displayed on a display unit 28 of the information recording and playback apparatus, or displayed on a monitor display connected to the information recording and playback apparatus in an OSD (on-screen display) manner. Further, the control unit 26 can connect to external networks through a network interface 32. Thereby, the control unit 26 can take in an electronic program guide through external networks.

Further, the control unit 26 controls the disc drive unit 12, the hard disk drive unit 14, the data processor unit 16, the encoder unit 20, and the decoder unit 36, on the basis of time data from a system time clock (STC) 34. Although recording and playback operations are performed in synchronization with the time clock from the STC 34, other operations may be performed at timing independent of the STC 34.

Further, an input signal from an operation input unit is input to the control unit 26. The operation input unit 3 is, for example, operation switches provided on the main body of the information recording and playback apparatus, and a remote controller which is independent of the main body. As another example, the operation input unit 30 may be a personal computer connected to the information recording and playback apparatus by wired or wireless communication. The information recording and playback apparatus performs playback, stop, recording, and editing, based on operation inputs through the operation input unit 30.

The decoder unit 36 has a memory video decoder, an audio decoder, and a video processor. A decoded output unit output from the decoder unit 36 is output from an signal output unit 38 to the outside.

Figure 1:
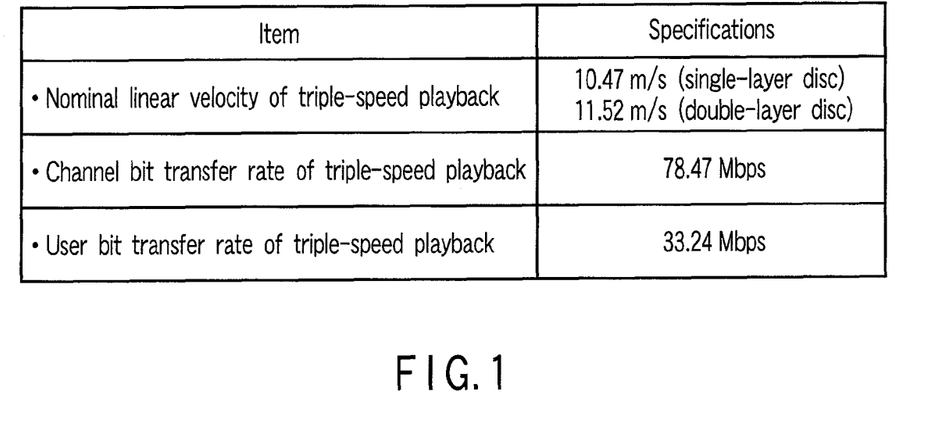
FIG. 1 is a diagram illustrating relationship between linear velocity of triple-speed playback and data transfer rate performed by an information recording and playback apparatus according to an embodiment of the invention.

FIG. 1 is a diagram illustrating relationship between the linear velocity of triple-speed playback and data transfer rate by the information recording and playback apparatus illustrated in FIG. 10.

To record or playback HD DVD-Video content and HD DVD Video Recording (HD-DVD-VR) content on a DVD-R/RW/Ram disc, the information recording and playback apparatus prepares a directory for HD DVD-Video content and/or a directory for HD DVD-VR content on a DVD-R/RW disc, and records HD DVD-Video content of HD DVD-Video application format and/or HD DVD-VR content of HD DVD VR application format in the directory.

The user bit transfer rate required for HD DVD-Video content is 33.24 Mbps. This rate is three times as high as the user bit data transfer rate of current DVDs. Therefore, to ensure the data transfer rate, it is necessary to rotate the DVD-R/RW/RAM disc at triple speed or more. DVD-R/RW discs should be rotated with stability at a linear velocity of at least 10.47 m/s in the case of single-layer discs and a linear velocity of at least 11.52 m/s (triple speed or more) in the case of double-layer discs, to record and playback the user data.

In the case of HD DVD-VR content, the user bit data transfer rate can be selected from the recording modes of 22.16 Mbps and 11.08 Mbps for extended recording, in addition to 33.24 Mbps. To perform recording and playback at 33.24 Mbps, it is necessary to rotate the disc with stability at triple speed or more in the same manner as HD DVD-Video content, to record and play back the user data. The necessary data bit rates are as illustrated in FIG. 1.

To rotate the disc at triple speed, it is necessary to set the dynamic imbalance of the disc smaller than the disc of single-speed playback. The dynamic imbalance is desirably 0.0044 g·m for 12-cm discs, and 0.0020 g·m for 8-cm discs.

Figure 2:
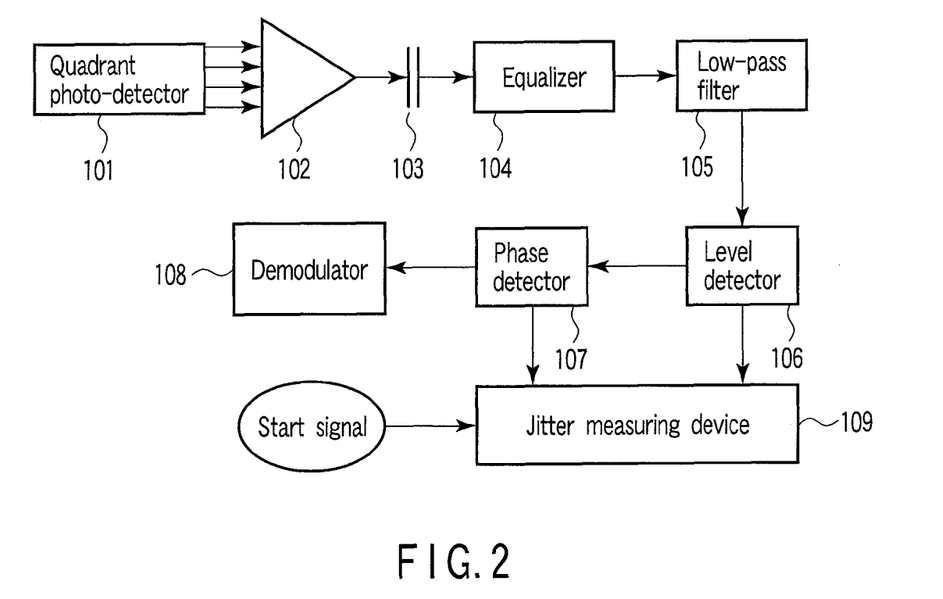
FIG. 2 is a diagram illustrating an example of a data playback circuit of the information recording and playback apparatus according to the embodiment.

FIG. 2 is a diagram illustrating an example of a data playback circuit which is formed by the disc drive unit 12, the data processor unit 16, and the decoder unit 36 of the information recording and playback apparatus illustrated in FIG. 10.

Figure 4:
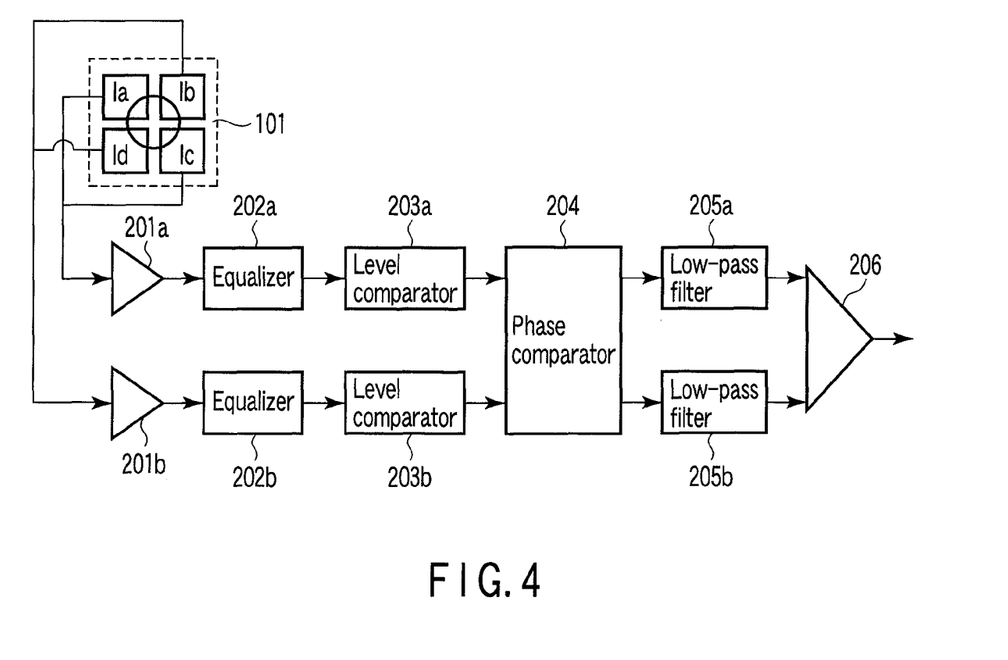
FIG. 4 is a diagram illustrating an example of a triple-speed playback servo circuit of the information recording and playback apparatus according to the embodiment.

The data playback circuit can play back a DVD-R/RW at triple speed. As illustrated in FIG. 4, the data playback circuit has a quadrant photo-detector 101, an amplifier 102, an AC coupling 103, an equalizer 104, a low-pass filter 105, a level detector 106, a phase detector 107, a demodulator 108, and a jitter measuring device 109.

The disc drive unit 12 has an optical pickup, and the optical pickup has the quadrant photo-detector 101. An optical beam from the optical pickup is focused onto the optical disc 10, and reflected light from the recording film of the optical disc 10 is detected by the quadrant photo-detector 101. A sum signal from the quadrant photo-detector 101 is amplified to a predetermined signal amplitude by the amplifier 102, and an HF signal is extracted by the AC coupling 103. The extracted HF signal passes through the equalizer 104 for triple-speed playback, and its frequency characteristic is adjusted. Next, noise component of the HF signal is removed by the low-pass filter 105, the HF signal is digitized by the level detector (slicer) 106, and a PLL clock of the HF signal is detected by the phase detector 107. The digitized signal is processed by the 8-16 demodulator 108, and bit data is played back. The jitter for the PLL clock of the digitized signal before being processed by the decoder 108 is measured by the jitter detector 109.

The jitter of DVD-R/RW discs at single-speed playback is provided as 8.0% or less by specifications. The jitter is desirably 8.0% or less also in triple-speed playback. In the signal processing circuit of the information recording and playback apparatus according to the embodiment, the margin of the playback system is designed with the jitter of single-speed playback. This is because it is desirable that the system can be used with same margin as the single-speed playback secured, in the case of triple-speed playback.

Figure 3:
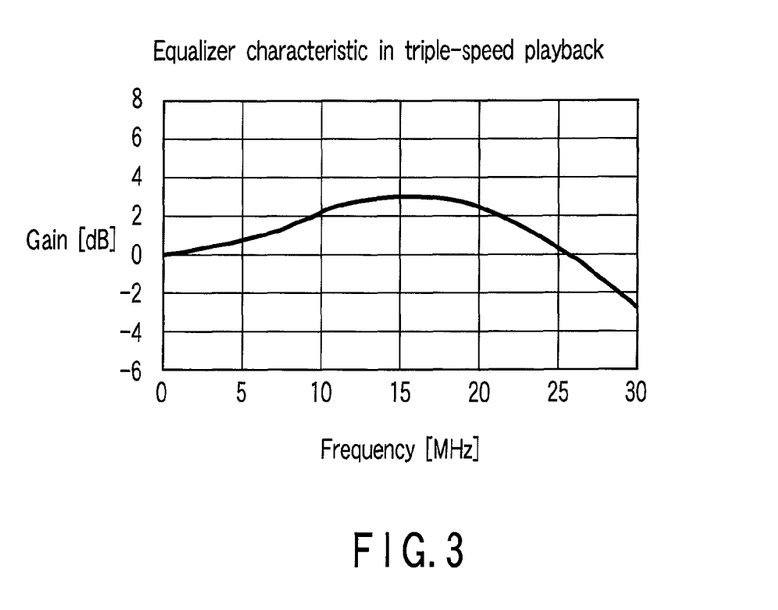
FIG. 3 is a diagram illustrating an example of a equalizer characteristic in triple-speed playback according to the embodiment.

FIG. 3 is a diagram illustrating an example of an equalizer characteristic in triple-speed playback.

When a DVD-R/RW is played back at triple speed, the playback frequency band is three times as high as that of the single-speed playback. Therefore, the frequency band of the equalizer 104 when the playback signal is digitized in playback is also three times as high as that of the single-speed playback. In single-speed playback, an equalizer characteristic of a signal with a frequency lower than 7.0 MHz is provided. In triple-speed playback, it is necessary to provide an equalizer characteristic of a signal with a frequency lower than 21.0 MHz, which is three times as high as the frequency in single-speed playback.

In the case of using the equalizer 104 and the low-pass filter 105, the allowable variation range of the gain desirably falls within ±1 dB in the same manner as in single-speed playback.

Further, the allowable variation range of the group delay should be set stricter than that n single-speed playback in consideration of increase in frequency, and desirably falls within ±1.5 ns at 19.5 MHz or less.

The gain in triple-speed playback should be set equivalent to that in single-speed playback. The gain at 15.0 MHz is desirably 3.2±0.3 dB in comparison with the gain of 0 MHz.

The low-pass filter 105 in triple-speed playback should be set to a frequency three times as high as that in single-speed playback. In the case of using a Bessel filter of order 6, the cutoff frequency of −3 dB is desirably 24.6 MHz.

FIG. 4 is a diagram illustrating an example of a triple-speed playback servo circuit included in the optical disk drive 12 of the information recording and playback apparatus illustrated in FIG. 10.

The triple-speed playback servo circuit has a quadrant photo-detector 101, amplifiers 201*a* and 201*b*, equalizers 202*a* and 202*b*, level comparators 203*a* and 203*b*, a phase comparator 204, low-pass filters 205*a* and 205*b*, and a difference amplifier 206.

In the case of DVD-R/RW, data is recorded on recording tracks (groups). A recorded recording track is tracked by detection of phase difference (DPD). In DPD, used is a differential signal between a sum signal A of optical detector Ia and Ic forming the quadrant photo-detector 101, and a sum signal B of optical detectors Ib and Id.

The sum signals A and B are amplified to a predetermined amplitude by the amplifiers 201*a* and 201, respectively. Thereafter, the frequency characteristics of the sum signals A and B are adjusted by the equalizers 202*a* and 202*b*, and binary waveforms at a predetermined threshold are formed by the level detectors 203*a* and 203*b*. The phase comparator 204 extracts phase difference signals of the binary waveforms of the sum signal A and the sum signal B. The phase comparator 204 extracts a phase difference signal C1 in which the sum signal A has a phase advance of the sum signal B, and a phase difference signal C2 in which the sum signal A has a phase delay from the sum signal B. The phase difference signals C1 and C2 pass through the low-pass filters 205*a* and 205*b*, respectively, to remove their high-frequency components, and a phase difference signal is generated by the differential amplifier 206. Tracking control is performed with the phase difference signal used as a tracking error signal.

Although the cutoff frequency of the low-pass filters 205*a* and 205*b* in single-speed playback is 30 kHz, it is necessary to increase the frequency in triple-speed playback. In the case of using a first-order filter, the cutoff frequency of −3 dB in triple-speed playback is desirably set to 56 kHz.

Figure 5:
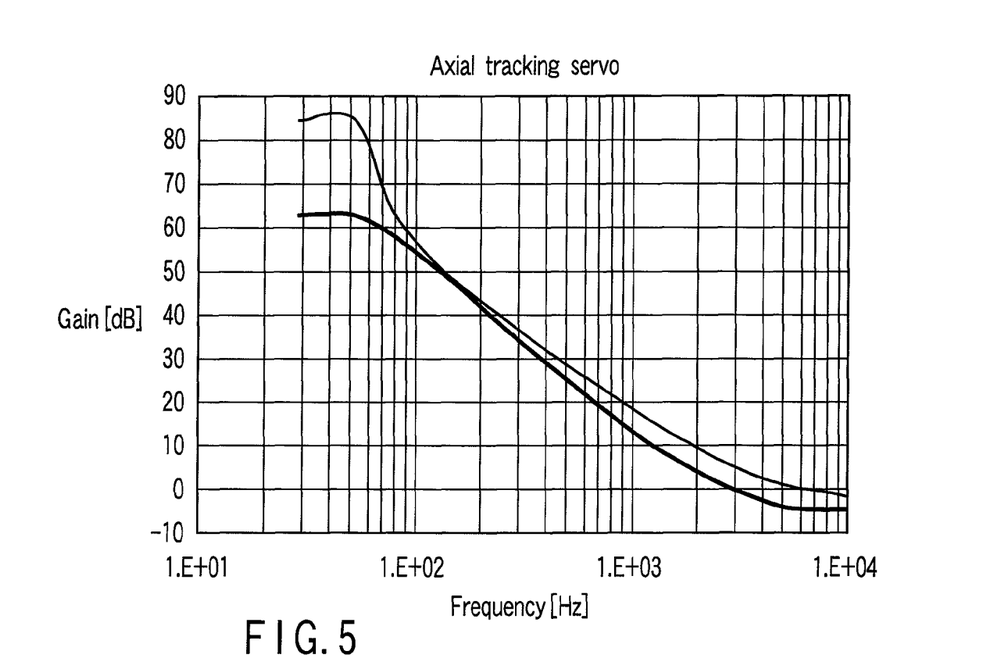
FIG. 5 is a diagram illustrating an example of a focus servo characteristic in the axial direction for triple-speed playback according to the embodiment.

FIG. 5 is a diagram illustrating an example of an axial focus servo characteristic for triple-speed playback.

Although the maximum runout acceleration in single-speed playback is 8 m/s$^2$, the maximum runout acceleration in triple-speed playback is desirably 32 m/s$^2$ to secure the margin of the disc. The runout of the disc is desirably 300 μm or less, and the focus error (focus servo residual quantity) when the focus servo is effective desirably falls within the range of not exceeding ±0.23 μm when measured at 10 kHz or less. The cutoff frequency in this case is 4.0 kHz at −3 dB.

Figure 6:
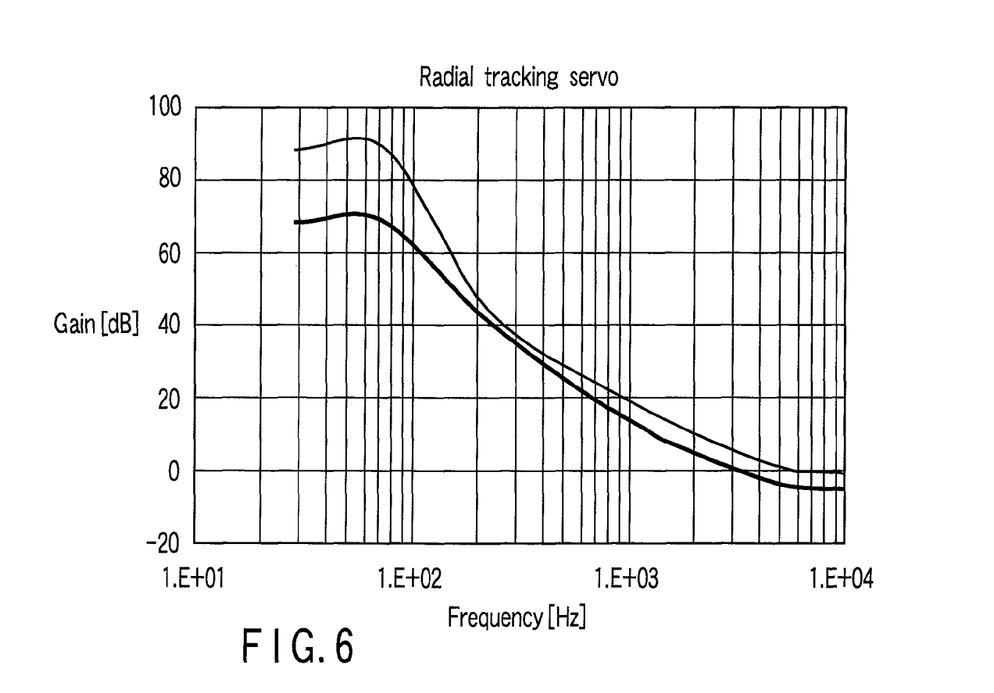
FIG. 6 is a diagram illustrating an example of a tracking servo characteristic in the radial direction according to the embodiment.

FIG. 6 is a diagram illustrating an example of a radial tracking servo characteristic.

Although the maximum eccentricity acceleration in single-speed playback is 1.1 m/s$^2$, the maximum eccentricity acceleration in triple-speed playback is desirably 4.0 m/s$^2$ to secure the margin of the disc. The eccentricity quantity of the disc is desirably 50μ or less, and the tracking error quantity (focus servo residual quantity) when the focus servo is effective desirably falls within the range of not exceeding ±0.022 μm when measured at 2.1 kHz or less. The cutoff frequency in this case is 4.5 kHz at −3 dB.

Figure 7:
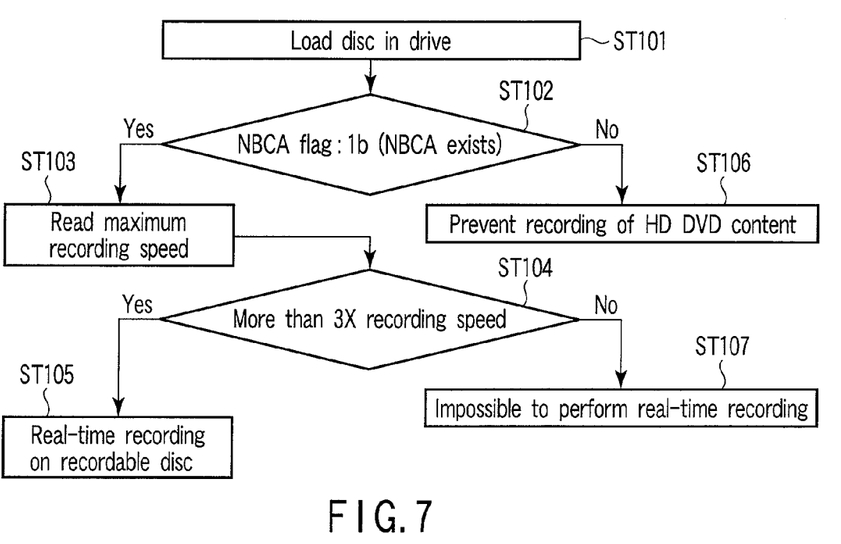
FIG. 7 illustrates a disc discrimination processing by which triple-speed recording can be performed by the information recording and playback apparatus according to the embodiment.

FIG. 7 is a diagram illustrating an example of disc discrimination processing in which triple-speed recording is possible by the information recording and playback apparatus illustrated in FIG. 10.

To record HD DVD/VR content, it is necessary that the narrow burst cutting area (NBCA) of the disc is valid. The control unit 26 of the information recording and playback apparatus determines whether the NBCA of the loaded disc (ST101) is valid or not (ST102). Specifically, the disk drive 12 and the data processor unit 16 of the information recording and playback apparatus read an NBCA flag on the DVD-R/RW disc, and the control unit 26 determines the validity of the NBCA (ST102). When the control unit 26 determines that the NBCA of the loaded disc is valid (NBCA is recorded) (ST102, YES) and the maximum recording speed of the disc is triple-speed or more (at least triple-speed as high as the predetermined recording speed [normal recording speed]) (ST103) (ST104, YES), the disk drive 12 and the data processor unit 16 record the HD DVD/VR content on the disc at triple recording speed (ST104).

A revision number (recording speed information) of specifications providing the recording speed is recorded on discs. Specifically, the disk drive 12 and the data processor unit 16 read the revision number, and the control unit 26 determines at which speed the disc can perform recording. When recording speed information of triple speed or more is supported, the disk drive 12 and the data processor unit 16 record the HD DVD/VR content on the disc in real time.

When the control unit 26 determines that the NBCA of the loaded disc is invalid (NBCA is not recorded) (ST102, NO), it is impossible to record the HD DVD/VR content on the disc in real time (ST106).

A copyright protection method called AACS is used for HD DVD/VR content for copyright protection of the content. This is because NBCA information is referred to by AACS. Further, also when the disc supports only a recording speed lower than triple speed (ST104, NO) although the NBCA is valid (ST102, YES), it is impossible to record the HD DVD/VR content on the disc at triple speed in real time (ST107).

Figure 8:
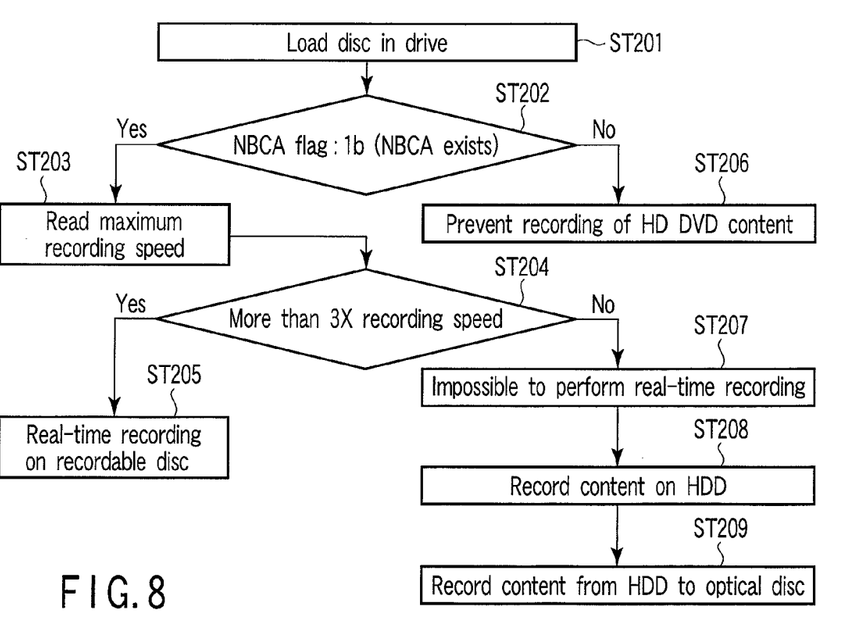
FIG. 8 is a flowchart illustrating recording processing of HD DVD content on a disc which supports only recording speed lower than triple-speed recording by the information recording and playback apparatus according to the embodiment.

FIG. 8 is a flowchart illustrating processing of recording HD DVD/VR content on a disc which only supports a recording speed lower than triple-speed recording by the information recording and playback apparatus of the embodiment.

When the control unit 26 of the information recording and playback apparatus determines that MBCA of the loaded disc (ST201) is valid (NBCA is recorded) (ST202, YES) and that the maximum recording speed of the disc is less than triple speed (less than three times as high as the predetermined recording speed [normal recording speed]) (ST203) (ST204, NO), it is impossible to record the HD DVD/VR content on the disc at triple speed in real time (ST207). Specifically, when the recording speed supported by the disc is lower than the triple speed, it is impossible to record the HD DVD/VR content on the disc at triple speed in real time (ST207).

Therefore, the control unit 26 and the data processor unit 16 temporarily store the HD DVD/VR content in the hard disk drive unit 14, and the data processor unit 16 and the disc drive unit 12 record the HD DVD/VR content recorded in the hard disk drive unit 14 at a data transfer rate lower than the triple speed.

For example, data of the recorded HD DVD/VR content is transferred to the data processor unit 16 for a double-speed recording disc at a speed corresponding to double speed. Thereby, it is possible to record the HD DVD/VR content on the double-speed recording disc.

Figure 9:
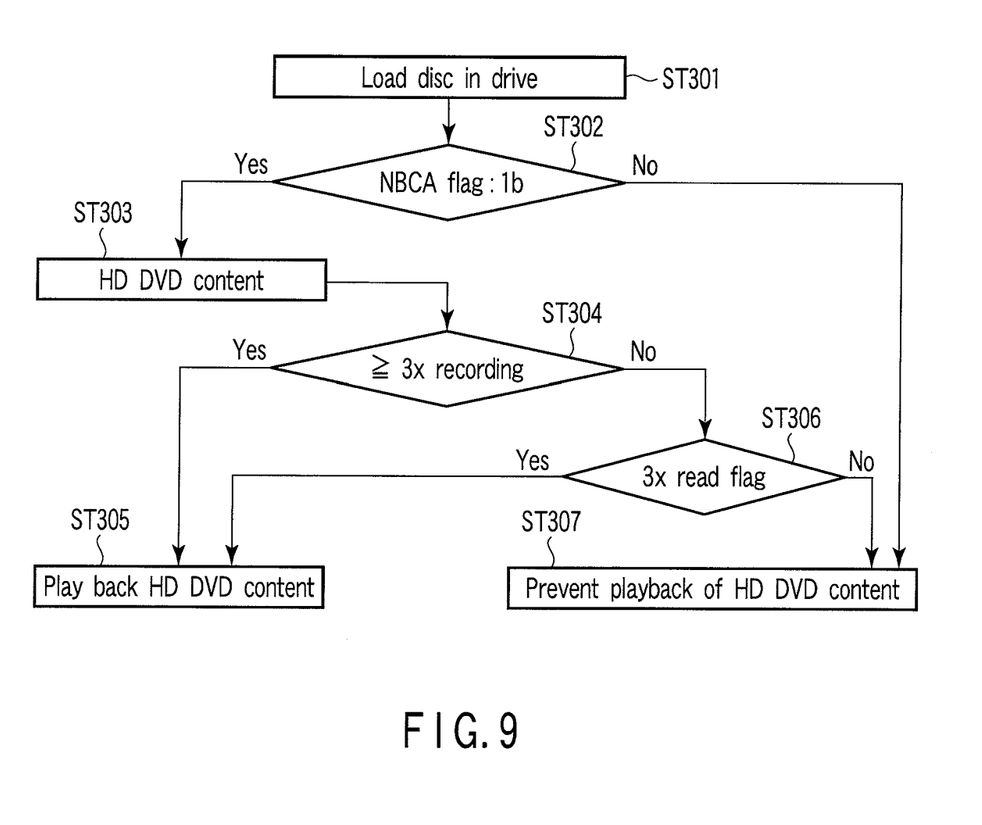
FIG. 9 is a flowchart illustrating playback processing of HD DVD/VR content recorded on a disc by the information recording and playback apparatus according to the embodiment.

FIG. 9 is a flowchart illustrating playback processing of HD DVD/VR content recorded on a disc by the information recording and playback apparatus illustrated in FIG. 10.

To play back HD DVD/VR content recorded on a disc, it is necessary that the narrow burst cutting area (NBCA) of the disc is valid. When the NBCA is invalid, the AACS is invalid and thus it is impossible to playback the HD DVD/VR content recorded on the disc. When the NBCA is valid, the AACS is valid. The control unit 26 of the information recording and playback apparatus determines whether the NBCA of the loaded disc (ST301) is valid or not (ST302). Specifically, the disk drive 12 and the data processor unit 16 of the information recording and playback apparatus read an NBCA flag on the DVD-R/RW disc, and the control unit 26 determines the validity of the NBCA (ST302). When the control unit 26 determines that the NBCA of the loaded disc is valid (NBCA is recorded) (ST302, YES), that HD DVD/VR content is recorded on the disc (ST303), and the maximum recording speed of the disc is triple speed or more (at least triple-speed as high as the predetermined recording speed [normal recording speed]) (ST304, YES), the control unit 26 plays back the HD DVD/VR content recorded on the disc (ST305), since the disc is compliant with triple-speed playback.

When the control unit 26 determines that the maximum recording speed of the disc is lower than the triple speed (ST304, NO) although it determines that the NBCA of the loaded disc is valid (NBCA is recorded) (ST302, YES), the control unit 26 plays back the HD DVD/VR content recorded on the disc (ST305), if identification information compliant with triple-speed playback is recorded on the disc (ST306, YES). When the control unit 26 determines that identification information compliant with triple-speed playback is not recorded on the disc (ST306, NO), triple-speed playback is not supported, and thus a problem may occur in playback of the HD DVD/VR content. Therefore, the control unit 26 determines that the NBCA of the loaded disc is valid (NBCA is recorded) (ST302, YES), that the maximum recording speed of the disc is lower than the triple speed (ST304, NO), and no identification information compliant with triple-speed playback is recorded on the disc (ST306, NO), and does not play back the HD DVD/VR content recorded on the disc.

The identification information compliant with triple-speed playback is preferably recorded on the disc in advance as physical format information of the disc, or embossed on the disc.

For example, identification information indicating triple-speed playback and single-speed playback is recorded by the following bits.

1b: triple-speed playback
0b: single-speed playback
or
1b: triple-speed playback and single-speed playback
0b: single-speed playback DVD-RAM discs do not have an NBCA. DVD-RAM discs have a BCA instead. Therefore, when the information recording and playback apparatus records HD DVD/VR content on a DVD-RAM disc or plays back HD DVD/VR content recorded on a DVD-RAM disc, the information recording and playback apparatus detects whether a BCA flag exists or not, instead of the NBCA flag described above. Thereby, the information recording and playback apparatus according to the embodiment can record HD DVD/VR content not only on DVD-R/RW discs but also on DVD-RAM discs, and play back HD DVD/VR content recorded on DVD-RAM discs.

Next, the maximum data transfer rate is explained. The maximum data transfer rate is provided by specifications as physical format information of discs. In DVD-R/RW discs, user data is recorded later. Therefore, the maximum data transfer rate of the disc is not provided in DVD-R/RW discs. For example, a flag indicating the data transfer rate is formed of 4 bits.

0010b: 10.08 Mbps (corresponding to single-speed playback)
1111b: Not provided

The maximum data transfer rate corresponding to triple-speed playback may be set only for DVD-R/RW discs which can be played back at triple speed.

Although support for at least triple speed is mentioned as a condition for recording and playback of HD DVD/VR content in the above explanation, the embodiment is not limited to it. For example, among HD DVD/VR content, there is HD DVD/VR content for which double-speed playback suffices. Specifically, the maximum data transfer rate corresponding to double-speed playback may be set as a condition for recording and playback of HD DVD/VR content.

0000b: 10.08 Mbps (corresponding to single-speed playback)
0011b: 20.16 Mbps (corresponding to double-speed playback)
0100b: 30.24 Mbps (corresponding to triple-speed playback)
1111b: Not provided The flag of the maximum data transfer rate of the disc may be used as a flag of triple-speed playback.

According to the information recording playback apparatus of the embodiment, when HD DVD/VR content is recorded on a disc of a recording speed higher than triple speed, it is possible to record the content on the disc at a recording speed higher than triple speed.

For example, the information recording playback apparatus may record a triple-speed playback content on a disc compliant with octuple-speed (8×) recording at octuple speed. A predetermined quantity of data of the content is stored in the buffer memory of the information recording playback apparatus, and the data is recorded on the disc at octuple speed. When stored data of the buffer memory is run out, the information recording playback apparatus waits until data is stored in the buffer memory, and octuple-speed recording is performed again. By intermittently performing recording each time a predetermined quantity of data is stored in the buffer memory, it is possible to record data at a speed higher than the triple speed.

As another example, the information recording playback apparatus can temporarily store HD DVD/VR content in the hard disk drive unit 14. Since the HD DVD/VR content is recorded on the hard disk drive unit 14, it is possible to record the HD DVD/VR content on the optical disc at a data transfer speed higher than the triple speed.

For example, HD DVD content recorded on the hard disk drive unit 14 is transferred to an octuple-speed disc at a data transfer rate corresponding to the octuple speed, and thereby the HD DVD-VR content can be recorded on the disc at octuple-speed. Also in this case, it is required that the NBCA of the disc is valid.

According to the embodiment, it is possible to appropriately record HD DVD content on DVD-R/RW RAM discs. Further, it is possible to appropriately play back HD DVD content recorded on DVD-R/RW/RAM discs.

While certain embodiments of the invention have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information recording apparatus configured to record content compliant with a first and second DVD standard on an information storage medium, the second DVD standard being defined for a higher image quality than the image quality of the first DVD standard, the apparatus comprising:
    a reading unit configured to read information recorded on the information storage medium;
    a determination unit configured to determine whether the narrow burst cutting area (NBCA) of the information storage medium is valid or not, and whether the supported maximum recording speed of the information storage medium is triple speed, three times faster of a normal recording speed of the first DVD standard, or more, based on the information read by the reading unit; and
    a recording unit configured to perform real-time recording of the content compliant with the second DVD standard on the information storage medium satisfying a condition that the NBCA of the information storage medium is valid and the supported maximum recording speed of the information storage medium is triple speed or more of the normal recording speed of the first DVD standard.

2. An information recording apparatus of claim 1, further comprising:
    a second recording unit configured to record the content compliant with the second DVD standard on an external storage device in real time at a recording speed slower than triple speed of the normal recording speed of the first DVD standard, on the condition that the NBCA of the information storage medium is valid and the supported maximum recording speed of the information storage medium is slower than triple speed of the normal recording speed of the first DVD standard.

3. An information recording method configured to record content compliant with a first and second DVD standard on an information storage medium, the second DVD standard being defined for a higher image quality than the image quality of the first DVD standard, the method comprising:
    reading information recorded on the information storage medium;
    determining whether the narrow burst cutting area (NBCA) of the information storage medium is valid or not, and whether the supported maximum recording speed of the information storage medium is triple speed or more of a normal recording speed of the first DVD standard, based on the read information; and
    performing real-time recording of the content compliant with the second DVD standard on the information storage medium satisfying a condition that the NBCA of the information storage medium is valid and the supported maximum recording speed of the information storage medium is triple speed or more of the normal recording speed of the first DVD standard.

4. An information recording method of claim 3, wherein the content compliant with the second DVD standard is recorded on an external storage device in real time, and the content compliant with the second DVD standard recorded on the external storage device is recorded on the information storage medium at a recording speed less than triple speed of the normal recording speed of the first DVD standard, on the condition that the NBCA of the information storage medium is valid and the supported maximum recording speed of the information storage medium is less than triple speed of the normal recording speed of the first DVD standard.

5. An information playback apparatus configured to play back an information storage medium recording content compliant with a first and second DVD standard, the second DVD standard being defined for a higher image quality than the image quality of the first DVD standard, the apparatus comprising:
    a reading unit configured to read information recorded on the information storage medium;
    a determination unit configured to determine whether the narrow burst cutting area (NBCA) of the information storage medium is valid or not, and whether the supported maximum recording speed of the information storage medium is triple speed or more of a normal recording speed of the first DVD standard, based on the information read by the reading unit; and
    a playback unit configured to perform triple-speed playback of the content compliant with the second DVD standard from the information storage medium satisfying a condition that the NBCA of the information storage medium is valid and the supported maximum recording speed of the information storage medium is triple speed or more of the normal recording speed of the first DVD standard.

6. An information playback apparatus of claim 5, wherein the playback unit is configured to perform triple-speed playback of the content compliant with the second DVD standard from the information storage medium satisfying a condition that the NBCA of the information storage medium is valid and the supported maximum playback speed of the information storage medium is three times faster or more of the normal playback speed of the first DVD standard.

7. An information playback method configured to play back an information storage medium recording content compliant with a first and second DVD standard, the second DVD standard being defined for a higher image quality than the image quality of the first DVD standard, the method comprising:

reading information recorded on an information storage medium;

determining whether the narrow burst cutting area (NBCA) of the information storage medium is valid or not, and whether the supported maximum recording speed of the information storage medium is triple speed or more of a normal recording speed of the first DVD standard, based on the read information; and     performing triple-speed playback of the content compliant with the second DVD standard from the information storage medium satisfying a condition that the NBCA of the information storage medium is valid and the supported maximum recording speed of the information storage medium is triple speed or more of the normal recording speed of the first DVD standard.

8. An information playback method of claim 7, wherein the content compliant with the second DVD standard is configured to be played back at triple speed from the information storage medium satisfying a condition that the NBCA of the information storage medium is valid and the supported maximum playback speed of the information storage medium is triple speed or more of the normal playback speed of the first DVD standard.

\* \* \* \* \*